(12) United States Patent
Crooks et al.

(10) Patent No.: US 6,622,118 B1
(45) Date of Patent: Sep. 16, 2003

(54) SYSTEM AND METHOD FOR COMPARING SIGNALS

(75) Inventors: Steven M. Crooks, Chelmsford, MA (US); Shawn M. Verbout, Chelmsford, MA (US)

(73) Assignee: Alphatech, Inc., Burlington, MA (US)

( * ) Notice: Subject to any disclaimer, the term of this patent is extended or adjusted under 35 U.S.C. 154(b) by 123 days.

(21) Appl. No.: 09/879,736

(22) Filed: Jun. 12, 2001

Related U.S. Application Data
(60) Provisional application No. 60/275,293, filed on Mar. 13, 2001.

(51) Int. Cl.[7] .............................................. H04R 15/00
(52) U.S. Cl. ..................... 702/190; 702/71; 702/106; 702/124; 702/126; 702/190; 708/201; 708/205; 708/300; 382/191; 382/260; 342/25; 342/91; 342/173
(58) Field of Search .......................... 702/71–77, 106, 702/107, 124, 126, 183, 189, 193, 194, 197, FOR 103, 104, 108, 110, 134, 135, 164, 168, 170, 171; 342/25, 91, 173, 174; 708/3–5, 8–9, 200, 201, 205, 277, 300, 314, 315, 403, 420, 514, 520; 382/190, 191, 260, 263, 264, 270, 278, 280, 295, 296

(56) References Cited

U.S. PATENT DOCUMENTS

| | | | |
|---|---|---|---|
| 5,313,210 A | * 5/1994 | Gail | 342/25 |
| 5,686,922 A | 11/1997 | Stankwitz et al. | |
| 6,011,505 A | * 1/2000 | Poehler et al. | 342/25 |
| 6,111,535 A | 8/2000 | Smith | |
| 6,130,641 A | * 10/2000 | Kraeutner et al. | 342/179 |
| 6,264,143 B1 | 7/2001 | Massonnet | |
| 6,400,306 B1 | * 6/2002 | Nohara et al. | 342/25 |
| 6,404,379 B1 | 6/2002 | Yu et al. | |

* cited by examiner

Primary Examiner—Marc S. Hoff
Assistant Examiner—Elias Desta
(74) Attorney, Agent, or Firm—Kevin A. Oliver; Foley Hoag LLP

(57) ABSTRACT

A method and system that include a first measurement signal and a second measurement signal that can be input to first and second filters. The filters can be subject to a first constraint to minimize the energy difference between the first and second measurement signals on a per frequency basis, and subject to a second constraint that includes a model frequency and phase response. By adapting the filters subject to the two constraints, coherent differences between the two measurement signals can be identified. In one embodiment, the system can be applied to Synthetic Aperture Radar (SAR) data.

60 Claims, 9 Drawing Sheets

SYSTEM AND METHOD FOR COMPARING SIGNALS

CLAIM OF PRIORITY

This application claims priority to provisional application U.S. Ser. No. 60/275,293 entitled "Adaptive Background Cancellation", and filed on Mar. 13, 2001, naming Steven M. Crooks, PhD. and Shawn M. Verbout, PhD. as inventors, the contents of which are herein incorporated by reference in their entirety.

BACKGROUND

1. Field

The methods and systems relate generally to signal and image data processing, and more particularly to improved detection in signal and image processing.

2. Description of Relevant Art

The separation of signal and noise can be understood as a fundamental issue in signal processing. Image processing is a well-known application of signal processing. Synthetic Aperture Radar (SAR) is one application that utilizes signal and image processing. In SAR applications, a Radar system that can be incorporated into an aircraft, for example, can be directed to regions on the earth's surface to provide coherent phase history data, or in-phase and quadrature signal data, that can be processed to provide an image of the regions. This process can often be referred to as mapping. In SAR applications, a region can be mapped at various time intervals depending on the application. For example, SAR mappings can be used to detect changes in position of vehicles or other changes such as the alteration of a structure, vehicles, natural resources, etc. Signal and image data comparison can be a significant aspect in detecting a change between two mappings of the same or similar regions. Generally, methods and systems for comparing image data can include a coherent (i.e., phase and magnitude) and/or non-coherent (i.e., magnitude only) differencing between the image data of two mappings to be compared. A problem with these comparison systems is that, for applications such as SAR that utilize a coherent sensor, the comparison does not compensate for phase differences that can be caused by the sensor. For example, in an illustrative SAR application, phase changes between successive mappings can be caused by different viewing geometries, and systems and methods can fail to compensate for such phase changes.

SUMMARY

The methods and systems described herein allow the comparison of two data signals. The first data signal can be applied to a first filter, and the second data signal can be applied to a second filter. The first and second filters can be constrained according to minimize the energy difference between the filtered first data signal and the filtered second data signal. The filters can also be constrained according to a first model response and a second model response, respectively. In one embodiment, the first model response can include unity magnitude and zero phase, while the second model response can include unity magnitude and variable phase.

In one embodiment, the mean energy between the filtered signals can be computed. Furthermore, the minimization can occur based on phase angle.

The energy difference can be computed on a frequency basis and compared to a threshold that can be fixed or adapted. The frequencies satisfying the threshold can be understood to represent differences between the signals.

The energy difference computation can include compensation terms that can be additive to the energy difference computation. In one embodiment, the additive term can include two additive components that include a first multiplier multiplied by a squared Euclidean norm based on the first filter, and a second multiplier multiplied by a squared Euclidean norm based on the second filter.

In an embodiment, the methods and systems can be applied to data from a coherent sensor that can be Synthetic Aperture Radar (SAR), acoustic data, seismic data, etc. The data can be provided in vectors of length N and processed in segments of length M, where N and M can be positive integers and M can be less than or equal to N.

Other objects and advantages will become apparent hereinafter in view of the specification and drawings.

DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope hereof.

For example, although the illustrated methods and systems can be described with relation to SAR data and imagery, those with ordinary skill in the art will recognize that the SAR application is provided for illustration and not limitation, and that the systems and methods described herein can be applied to other signal and image data processing applications.

Figure 1:
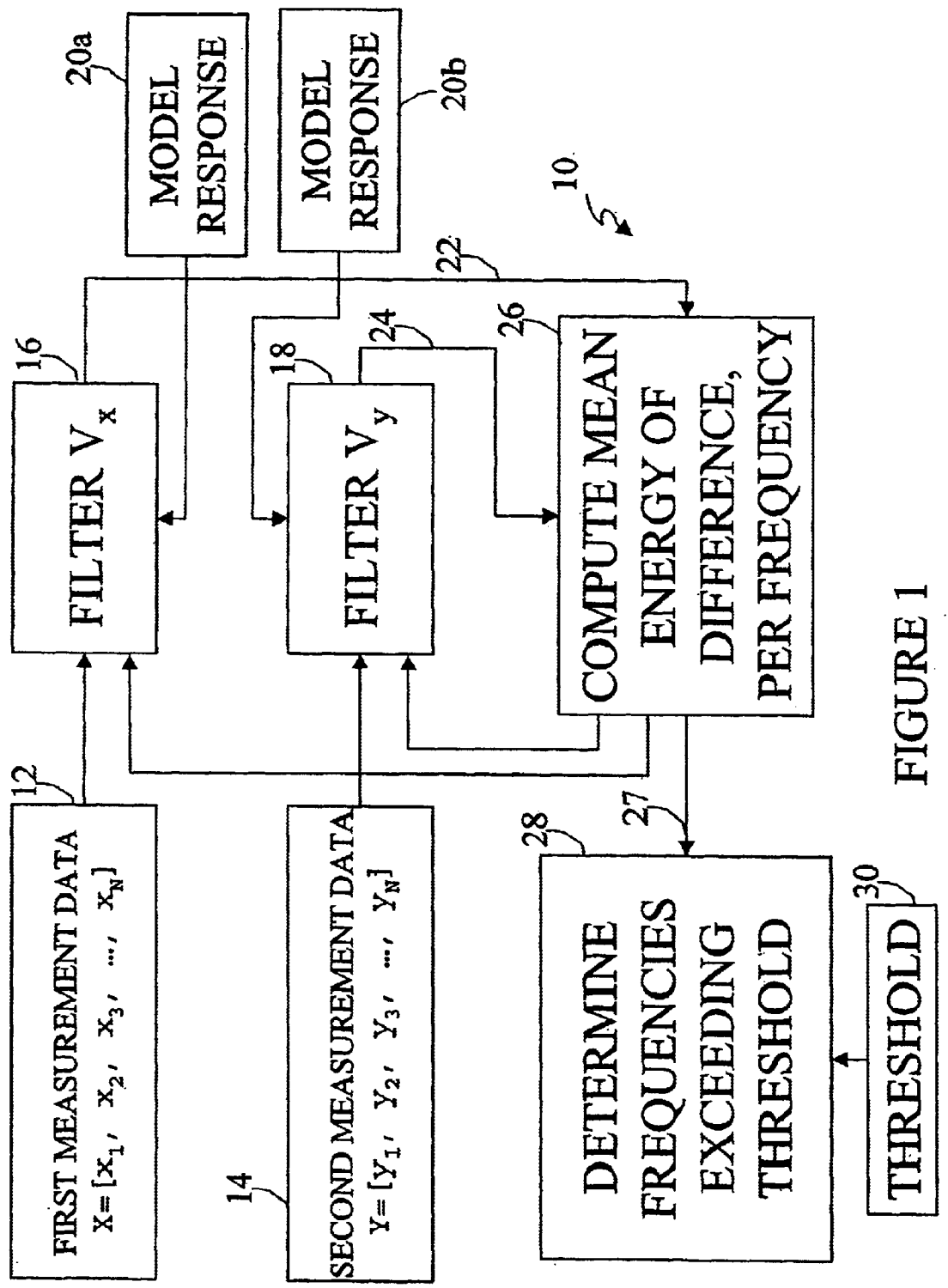
FIG. 1 is a diagram of a system that employs the techniques described herein to compare two signals.

FIG. 1 provides an illustrative system 10 that practices the methods and systems presented herein to compare two data signals. For the purposes of discussion with respect to the illustrated embodiment of FIG. 1, it can be understood that the FIG. 1 application includes two SAR signals that can be portions of a continuous-dwell SAR history, wherein a first signal occurs at a time preceding a second signal.

Accordingly, for this illustrative application, the first signal and the second signal can include complex data components (e.g., in-phase and quadrature) that can be referred to herein as phase history data. Those with ordinary skill in the art will recognize that the phase history data for the first signal and the second signal can be the basis for two images, respectively. Accordingly, the signal data for the respective signals can be converted to a rasterized format. Similarly, those with ordinary skill in the art will recognize that image data from two images can be converted to first signal data and second signal data by utilizing, for example, a two-dimensional inverse discrete Fourier transform. Other signal processing techniques can also be performed to obtain the first signal data and second signal data. For example, in a SAR illustrative embodiment, extant aperture weighting can be estimated and removed to provide a phase history magnitude that is approximately flat. Because the methods and systems herein are not limited to SAR data or image data, those with ordinary skill in the art will recognize that there are many methods of obtaining and systems to provide the first signal data and the second signal data as provided herein. Furthermore, it is not necessary that the first signal data and second signal data be complex.

For purposes of discussion, in the illustrative SAR example, the first and second data signals can be understood to be measurements from the same geographic area, although the techniques provided herein are not limited to such understanding. Also for purposes of discussion, the first signal data can be referred to herein as a "left sub-aperture" 12, while the second signal can be referred to herein as the "right sub-aperture" 14. Additionally, the left sub-aperture 12 can be understood to be represented by a vector of the form $X=[x_1, x_2, x_3, \ldots, x_N]$, where $x_i$ can be complex data based on, for example, phase history data of the left sub-aperture 12, while the right sub-aperture 14 can be understood to be represented by a vector of the form $Y=[y_1, y_2, y_3, \ldots y_N]$, where $y_i$ can be complex data based on phase history data of the right sub-aperture 14.

Those with ordinary skill in the art will recognize that although the example herein provides that X and Y 12, 14 include N elements where N is a positive integer, the length of X and Y 12, 14 may not be the same, as the data from which X and Y 12, 14 can be derived, may not be of the same length. For example, as indicated previously, X and Y can be derived from image data, where the left sub-aperture 12 and right sub-aperture 14 can be differing sizes and hence include a different number of data elements.

As will be shown herein, and as FIG. 1 illustrates, the left sub-aperture 12 can be applied to a first filter, $V_x$ 16, and the right sub-aperture 14 can be applied to a second filter, $V_y$ 18. For the embodiments discussed herein, including mathematical representations as also provided herein, the signal data from X and Y 12, 14 can be understood to be input to the filters 16, 18 in segments of length M, where M can be a positive integer that is less than N. Those with ordinary skill in the art will recognize that this is not a limitation on the methods and systems, but an understanding provided to better illustrate the wide applicability of the techniques to varying signal sizes.

In the FIG. 1 embodiment, the first and second filters, $V_x$ 16 and $V_y$ 18, can be understood to satisfy two objectives. In a first objective, the filters 16, 18 should not attenuate or otherwise distort a signal that can otherwise be understood to represent a model response 20a, 20b. Those with ordinary skill in the art will recognize that the model response 20a, 20b can be a frequency response that can include a magnitude and phase that can be specified for one or more frequencies. In the illustrated system, there is a model response 20a, 20b for the first and second filters 16, 18, respectively, although in some embodiments, there can be a single model response 20a, 20b for both filters 16, 18. In the SAR application provided for illustration, for example, the model response 20a, 20b can be an ideal point scatterer that typically can be represented at a known frequency, wherein the filters 16, 18 can "pass" the idealized point scatterer response through the filters 16, 18 without distortion.

In a second objective, the filters 16, 18 should minimize, per frequency 26, the energy difference between an output 22 of the first filter 16 and an output 24 of the second filter 18. Those with ordinary skill in the art will recognize that the combinations of the first and second objectives provide a system 10 such that the energy difference 26 between the first filter output 22 and the second filter output 24 for a frequency that has not changed, can be zero in an ideal system, and very small otherwise. In the SAR illustration, for example, for a left sub-aperture element 12 and corresponding right sub-aperture element 14 that include a point scatterer that does not change between the left sub-aperture 12 and the right sub-aperture 14, the mean difference 26 can be small. Alternately, if a point scatterer does change significantly between the left sub-aperture 12 and the right sub-aperture 14, the post-filtering difference signal 26 for the systems and methods of FIG. 1 10 may not be small and hence can indicate a changed condition between the two sub-apertures 12, 14.

Referring again to FIG. 1, the respective filter outputs 22, 24 can be differenced and the energy in the difference signal can be computed 26. The resulting energy signal 27 can thus be processed 28 to determine those frequencies that have undergone a substantial change between the left and right sub-apertures 12, 14. For the illustrative embodiment of FIG. 1, the processing can include a comparison to a threshold 30, although other techniques can be used. The illustrated threshold 30 can be pre-defined according to application. Additionally and optionally, the threshold 30 can be adaptive or otherwise altered.

Returning to the filters, $V_x$, $V_y$ 16, 18 of FIG. 1, for the illustrated embodiments, the filters 16, 18 can be understood to be Finite Impulse Response (FIR) filters that include M samples, where M can be a positive integer that can be less than N, the number of elements in the left and right sub-apertures 12, 14. Accordingly, as indicated previously, the left and right sub-apertures 12, 14 can be understood as being processed by the respective filters 16, 18 in M-sized subsequences or segments that can be expressed as $X_i=[x_i, x_{i+1}, x_{i+2}, x_{i+3}, \ldots x_{i+M-1}]$ for the left sub-aperture 12, and $Y_i=[y_i, y_{i+1}, y_{i+2}, y_{i+3}, \ldots y_{i+M-1}]$ for the right sub-aperture 14.

For the illustrated system of FIG. 1, it can thus be understood that the filters 16, 18 can be designed according to Equations (1), (2), and (3)

$$\underset{v_x,v_y,\theta}{MINIMIZE} \sum_{i=1}^{N-M+1} |v_x^T x_i - v_y^T y_i|^2 \qquad (1)$$

where "T" indicates conjugate vector transpose, and $\theta$ represents phase angle.

Equations (1) can therefore be further constrained according to the response of an ideal point scatter, or mathematically, constrained subject to the limitations of Equations (2) and (3).

Those with ordinary skill in the art will recognize that because the filter vectors $V_x$ and $V_y$ 16, 18 can be size M, and the sub-segments of X and Y 12, 14 are size M, the two inner products as indicated by Equation (1), provide a scalar difference.

Similarly, for the illustrative embodiment according to Equations (2) and (3), Equation (2) indicates that the model response 20*a* for the left sub-aperture filter 16 can provide unity gain and zero phase as a model of an ideal scatterer. Alternately, tile model response 20*b* for right sub-aperture filter 18 can be represented in vector form as $E=[1, e^{j\omega}, e^{j2\omega}, \ldots, e^{j(M-1)\omega}]$, where ω can be a complex sinusoidal frequency that corresponds to an image location of interest. The model response 20*b* for the right sub-aperture filter 18 thus includes unity gain or magnitude and an indeterminate phase to provide for an unknown scatterer phase. This model response 20*b* (Equation (3)) can allow a phase shift to be intentionally introduced to better align the left and right sub-apertures 12, 14 and further reduce residual energy in the difference signal that can result from an unknown scatterer phase. The unknown phase shift in the model response 20*b* allows a minimization of the energy difference over phase, as indicated by Equation (1).

Accordingly, Equation (1) provides minimization of the difference signal over $V_x$ 16 and $V_y$ 18, otherwise referred to as the optimization vectors, and also minimization of the difference signal over phase angle θ.

In another embodiment of the techniques, Equation (1) can minimize a mean energy computation that can be utilized rather than the summation of energy values. Additionally and optionally, further conditioning terms can be included in the minimization term of Equation (1). The conditioning terms can be represented as $\alpha \cdot \|V_x\|^2 + \beta \cdot \|V_y\|^2$, where α and β can be selected depending upon the embodiment and/or application. In one embodiment, α and β can be pre-selected and fixed, while in another embodiment, α and β can be variable and/or adaptable. For example, in a SAR embodiment according to the example herein where the constraint includes an ideal point scatterer, α and β can be selected to cause the optimal filters, $V_x$ and $V_y$, to match the form of the ideal scatterer response to a desired degree. Those with ordinary skill in the art will recognize that the conditioning terms for this embodiment can include the multiplication of α and β by the square of the Euclidean norm of $V_x$ and $V_y$ 16, 18, respectively.

Referring now to Equation (4), the optimization vectors $V_x$ 16 and $V_y$ 18 can be represented as a single column vector V, where:

$$v = \begin{bmatrix} v_x \\ v_y \end{bmatrix} \tag{4}$$

Furthermore, because the squared magnitude terms from Equation (1) can be expanded and written in quadratic form, a matrix H can be formulated to include the quadratic combinations of Equation (1) as follows:

$$H = \begin{bmatrix} \sum_{i=1}^{N-M+1} x_i x_i^T & -\sum_{i=1}^{N-M+1} x_i y_i^T \\ \sum_{i=1}^{N-M+1} y_i x_i^T & \sum_{i=1}^{N-M+1} y_i y_i^T \end{bmatrix} \tag{5}$$

Accordingly, the constraints of Equations (2) and (3) can be represented by Equations (6) and (7), as follows:

$$D = \begin{bmatrix} e & o \\ o & e \end{bmatrix} \tag{6}$$

$$c(\theta) = \begin{bmatrix} 1 \\ e^{j\theta} \end{bmatrix} \tag{7}$$

Using Equations (4) through (7), Equation (1) can be re-written according to Equation (8):

$$\underset{v,\theta}{\text{minimize }} v^T H v \text{ subject to } D^T v = c(\theta) \tag{8}$$

Those with ordinary skill in the art will recognize that, when it is assumed that H is nonsingular, it can be shown that the minimization problem of Equation (8) can yield a solution given by, $$v = H^{-1} D (D^T H^{-1} D)^{-1} c(\theta) \tag{9}$$

By substituting this solution into Equation (1), Equation (1) can be written alternately as Equation (10), wherein ABC refers to the implementation by the methods and systems described herein and known as "Adaptive Background Cancellation", or "ABC":

$$ABC(\omega) = \min c^T(\theta)(D^T(\omega) H^{-1} D(\omega))^{-1} c(\theta) \tag{10}$$

Because the 2×2 Hermitian quadratic form of Equation (10) includes three independent terms of which only one independent term depends on θ, the minimization of Equation (10) over phase angle θ can be performed analytically. It can be noted that the value of H does not change based on the image location being processed, while the value of D does change depending on image location, thereby explicitly indicating the dependence of D on ω.

To gain a better understanding of the methods and systems provided herein, otherwise referred to as Adaptive Background Cancellation, or ABC, the techniques can be applied to another SAR example in which the left and right sub-aperture phase histories 12, 14 include responses from three ideal point scatterers. For this illustrative case, the sub-apertures 12, 14 can be understood to include one-hundred samples in which the three ideal point scatterers can be represented by the frequency (ω), amplitude (A), and phase (φ) values in the respective sub-apertures as presented by Table 1.

TABLE 1

Ideal Point Scatterer Characteristics

|  | Left Sub-Aperture | Right Sub-Aperture |
|---|---|---|
| Scatterer 1 | ω = 148π/150<br>A = 20<br>φ = 0 | ω = 148π/150<br>A = 20<br>φ = π/2 |
| Scatterer 2 | ω = 151π/150<br>A = 1<br>φ = 0 | ω = 151π/150<br>A = 0.99<br>φ = 0 |
| Scatterer 3 | ω = 161π/150<br>A = 20<br>φ = π/2 | ω = 161π/150<br>A = 20<br>φ = 0 |

From Table 1, it can be noted that the scatterer frequencies do not change between the left and right sub-apertures 12, 14, and the three frequencies in this example are close in the vicinity of ω=π. Additionally, scatterer two includes an amplitude change from the left sub-aperture 12 to the right sub-aperture 14 that may be difficult to detect since the magnitude of scatterer two is small relative to the magnitudes of scatterers one and three.

Figure 2:
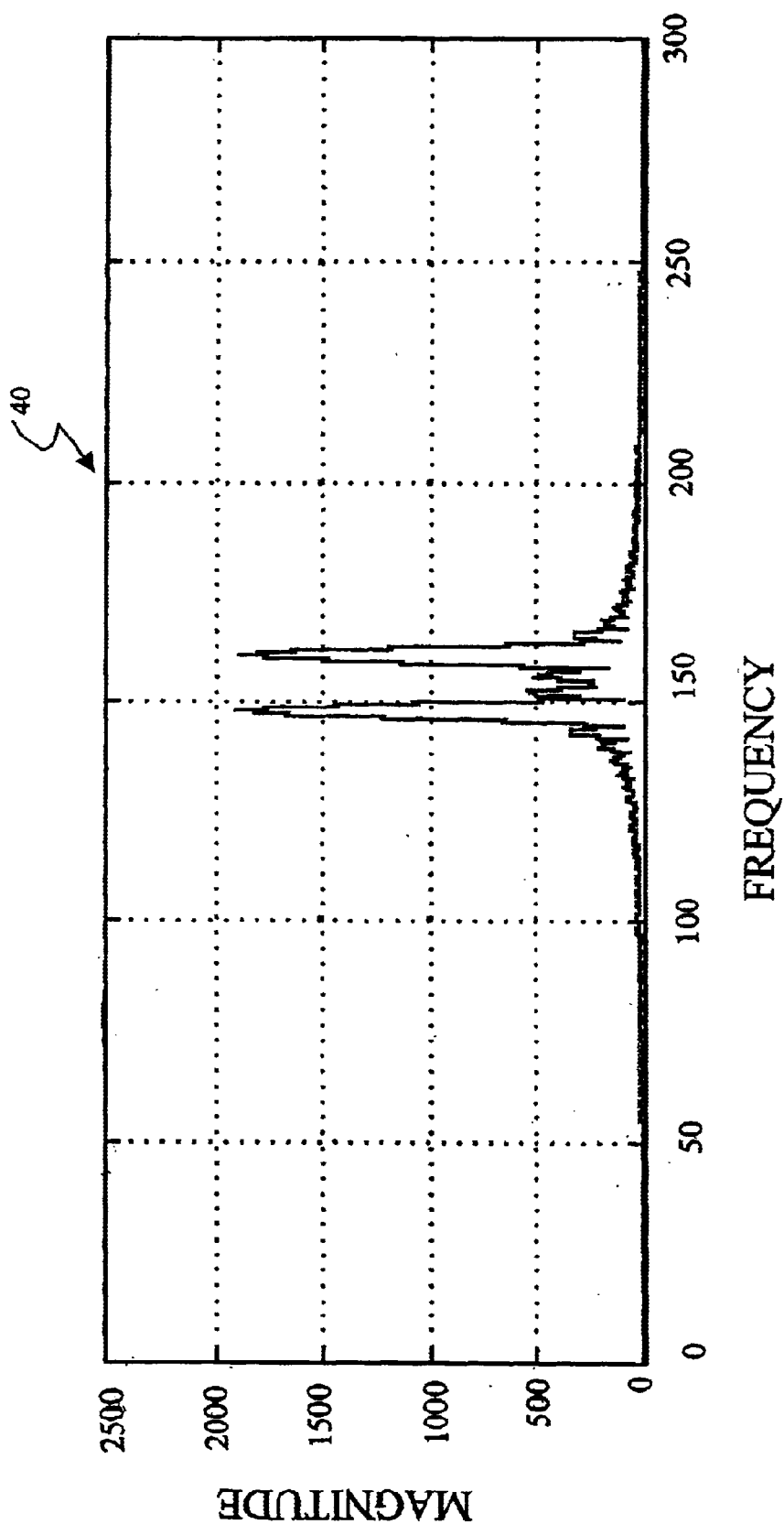
FIG. 2 is a Fourier transform representation of a first signal.
Figure 3:
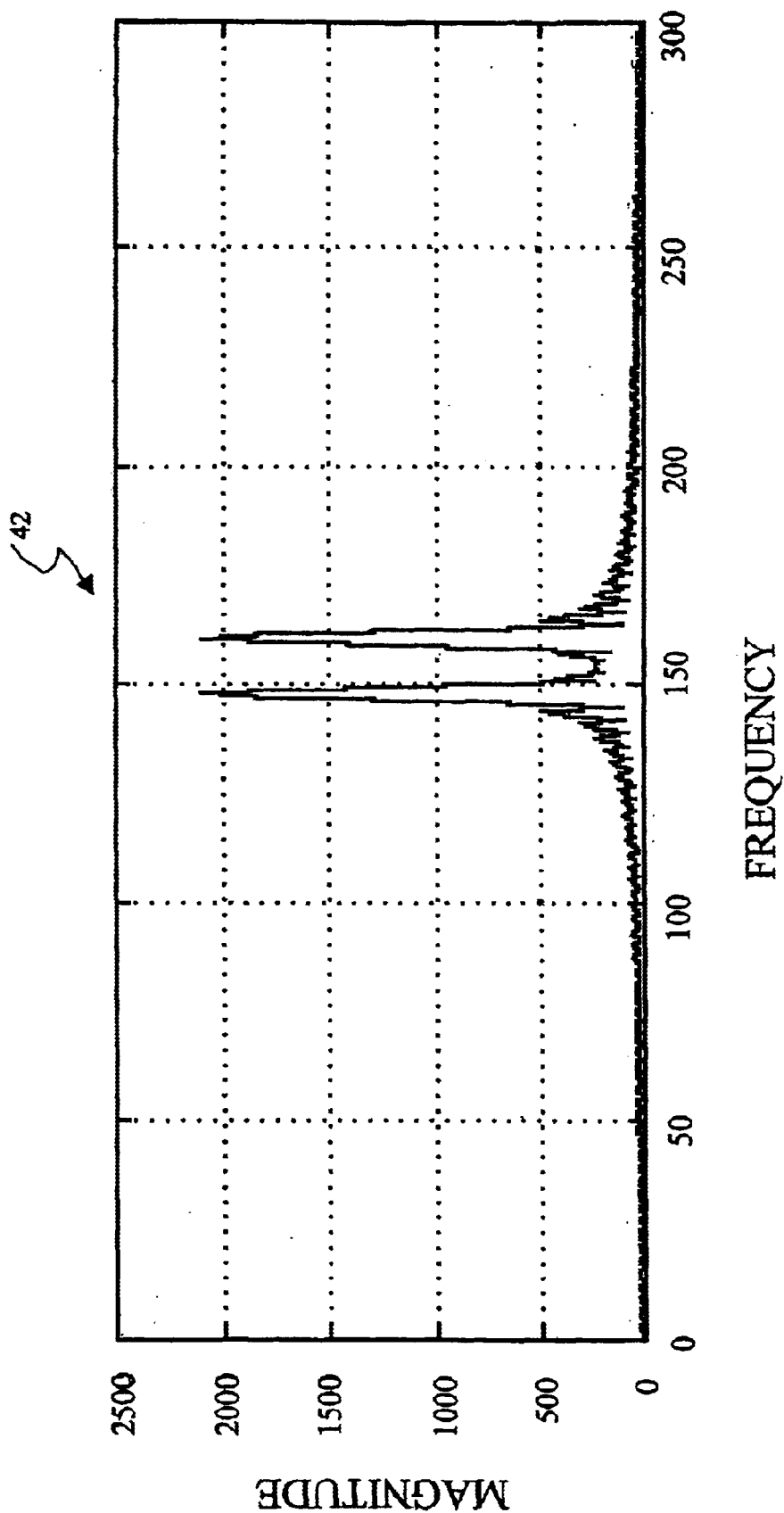
FIG. 3 is a Fourier transform representation of a second signal.
Figure 4:
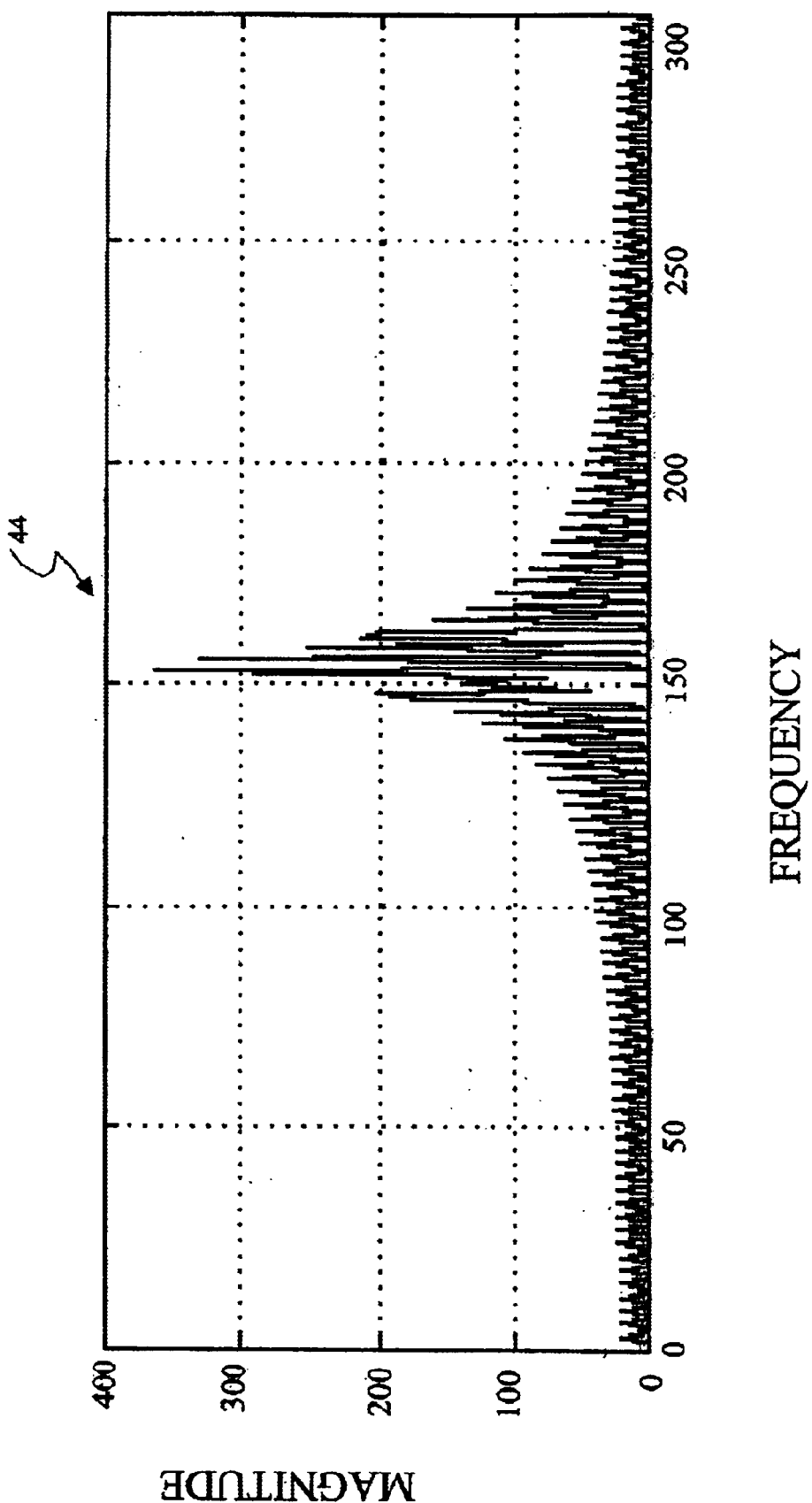
FIG. 4 is a Fourier transform representation of a result for a non-coherent detection method applied to the signals of FIGS. 2 and 3.

Referring now to FIG. 2, there is an illustration of a Fourier transform magnitude response 40 corresponding to a left sub-aperture 12 having the point scatterers of Table 1, while FIG. 3 42 provides an illustrative right sub-aperture 14 Fourier transform magnitude response for scatterers according to Table 1. FIG. 4 is an illustration of the output of a method and system that receives two signals as input, such as those illustrated by FIGS. 2 and 3, and produces as output, an absolute difference 44 between signals. An absolute difference of the Fourier responses of FIGS. 2 and 3 is shown in FIG. 4, and such a method and system can otherwise be referred to as non-coherent change detection.

Figure 5:
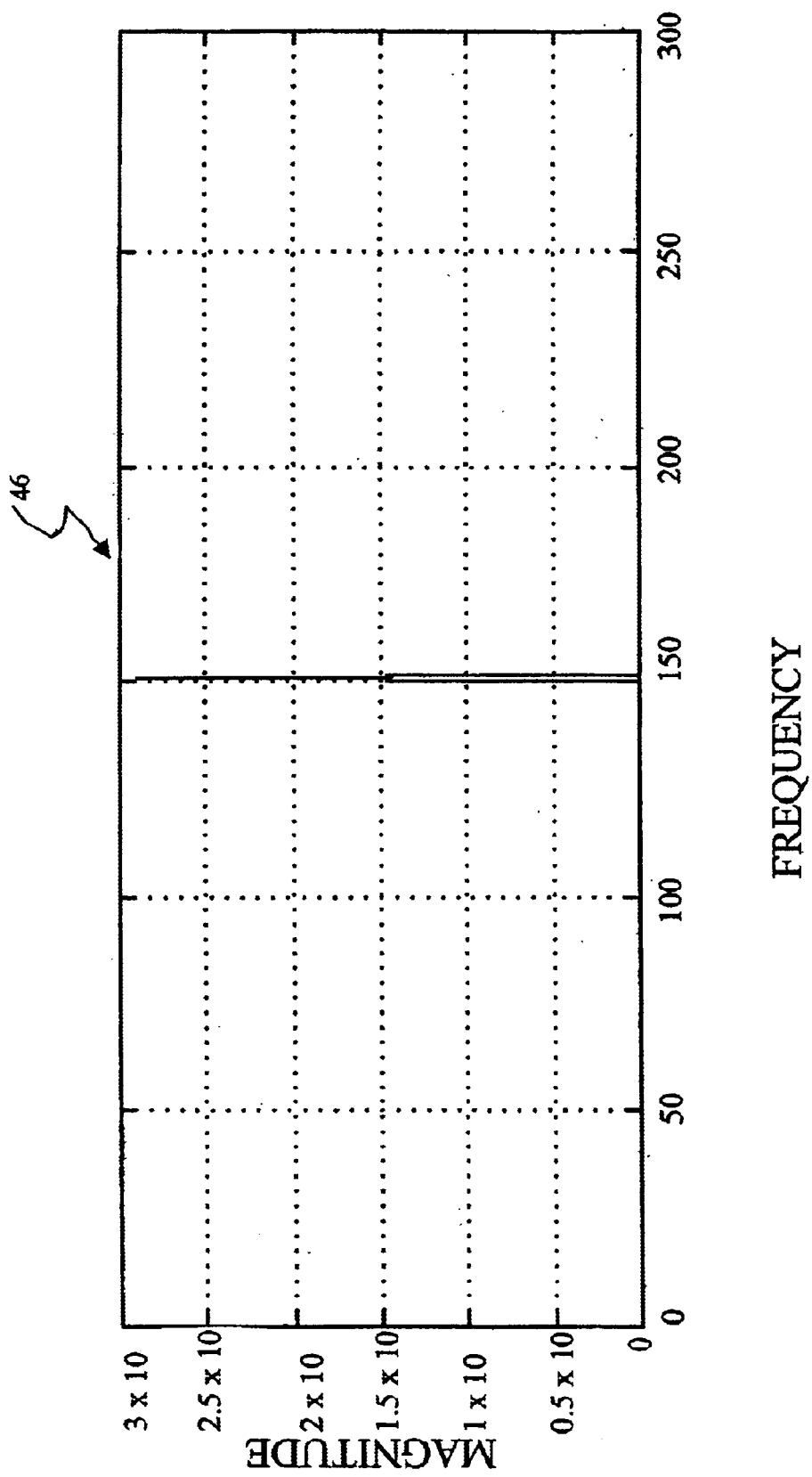
FIG. 5 is a Fourier transform representation of a signal produced from the methods and systems disclosed, as applied to the signals of FIGS. 2 and 3.

FIG. 5 provides an output 46 of a method and system that utilizes the ABC techniques presented herein and utilizes fifty-point (i.e., M=50) FIR filters 16, 18. In comparing FIGS. 4 and 5, the magnitude change for scatterer two is masked in FIG. 4 by the relative magnitudes of scatterers one and three. Alternately, an analysis of FIG. 5 indicates that a method and system employing ABC was capable of detecting the small change in scatterer two. The increased resolution of the ABC method and system can also be evidenced by the magnitude scales of FIG. 4 with respect to FIG. 5.

Those with ordinary skill in the art will understand that because the ABC system and method can be understood as data-adaptive, the method and system apply a different pair of filters 16, 18 to the sub-apertures 12, 14 for different output image locations.

Figure 6A:
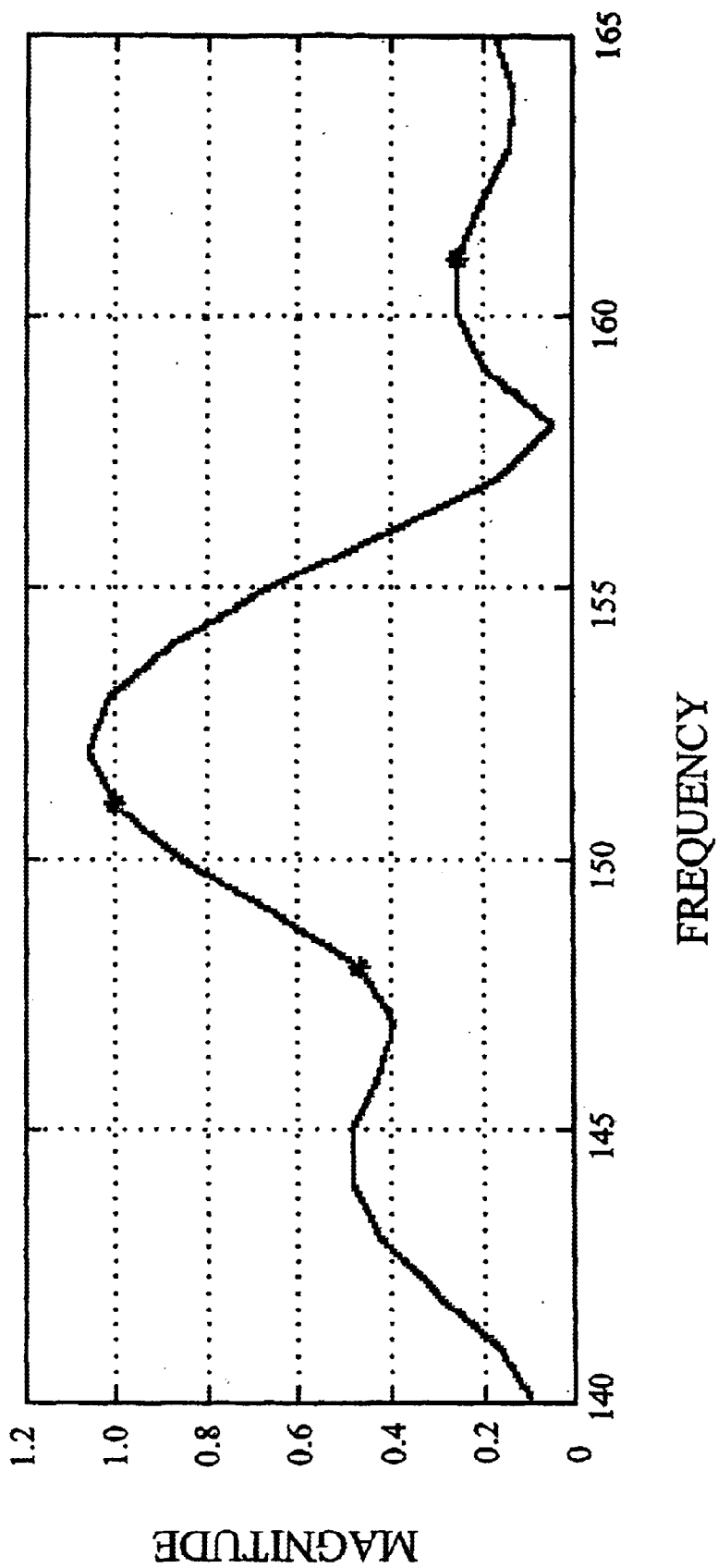
FIG. 6A is a Fourier transform representation of a magnitude response for a first filter according to the disclosed techniques.
Figure 6B:
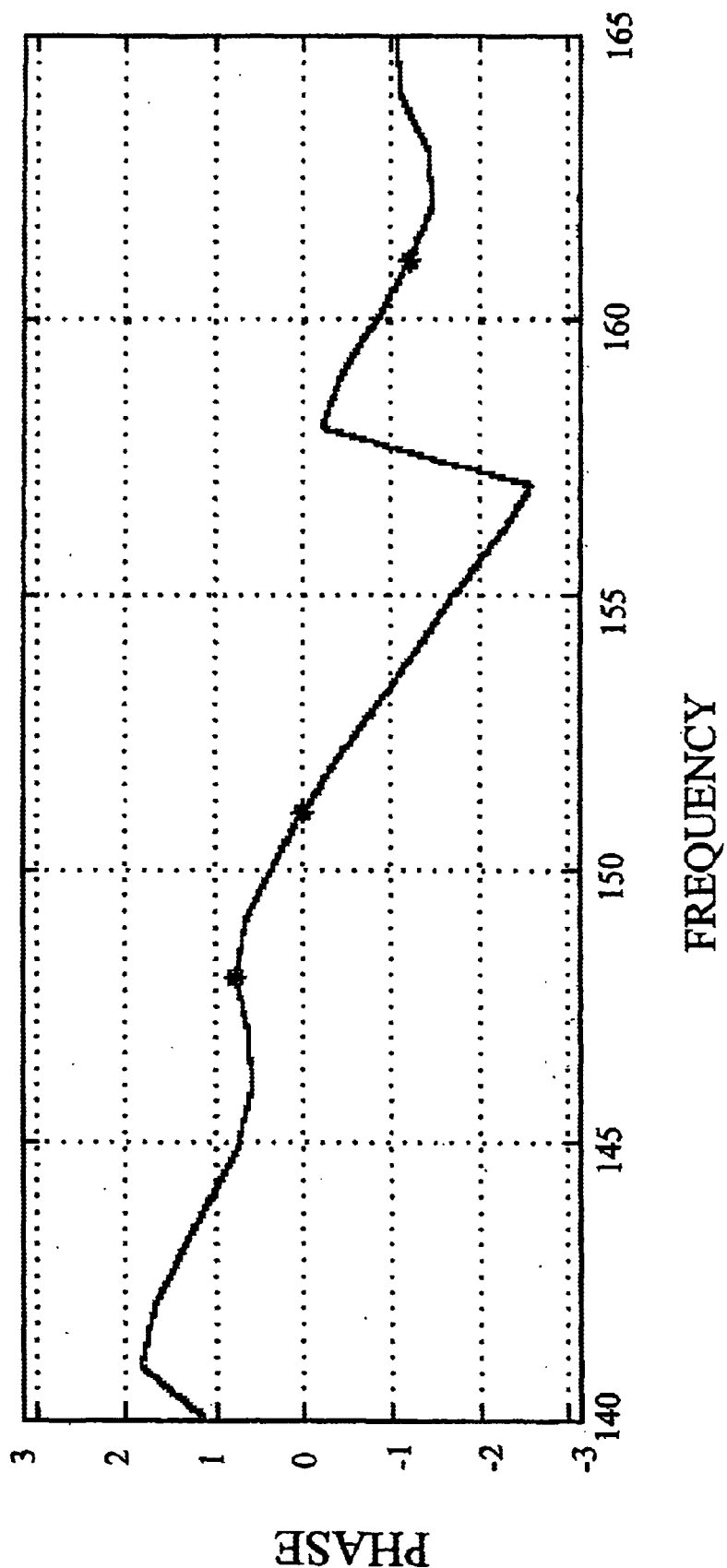
FIG. 6B is a Fourier transform representation of a phase response for the first filter having the magnitude response of FIG. 6A.
Figure 7A:
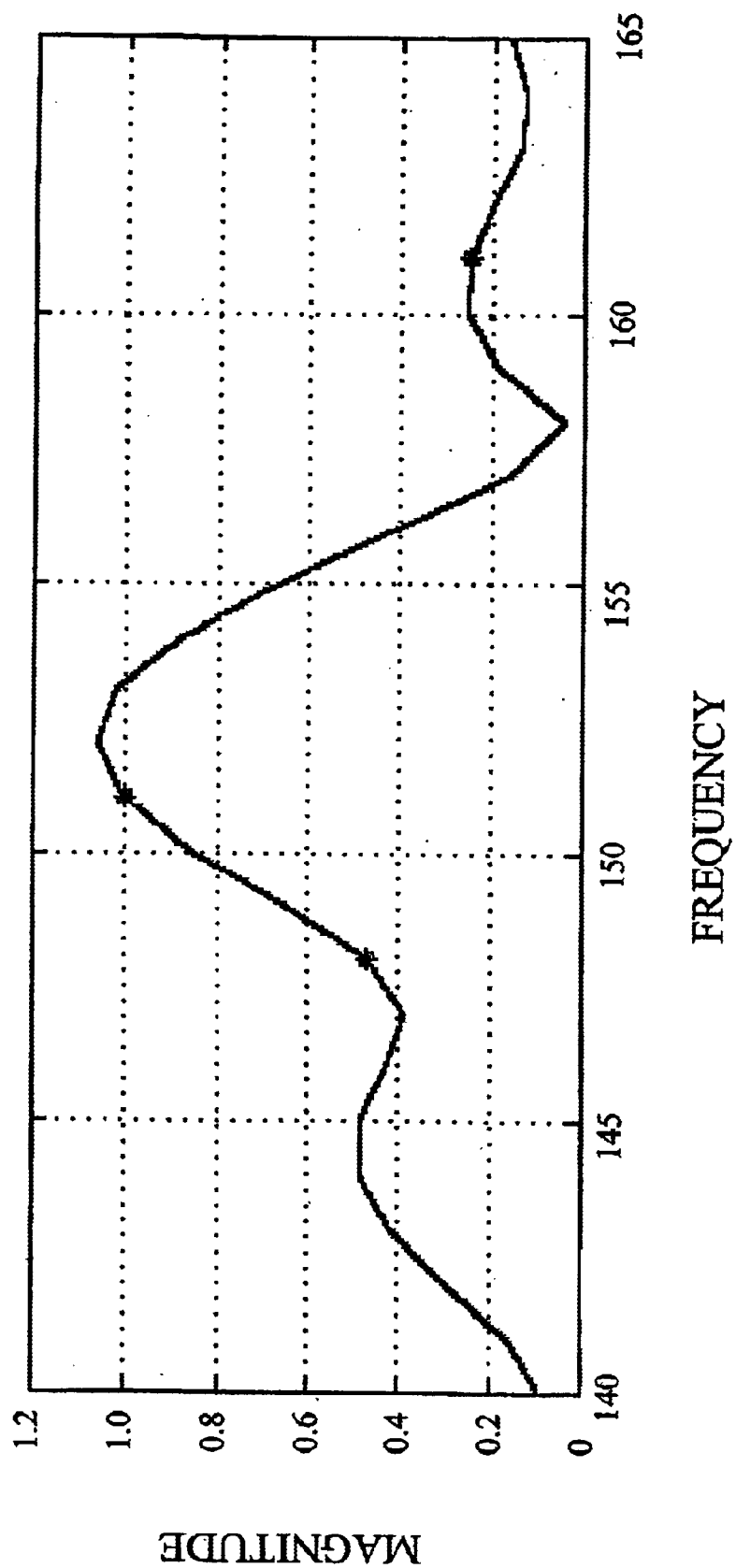
FIG. 7A is a Fourier transform representation of a magnitude response for a second filter according to the disclosed techniques; and, FIG. 7B is a Fourier transform representation of a phase response for the second filter having the magnitude response of FIG. 7A.
Figure 7B:
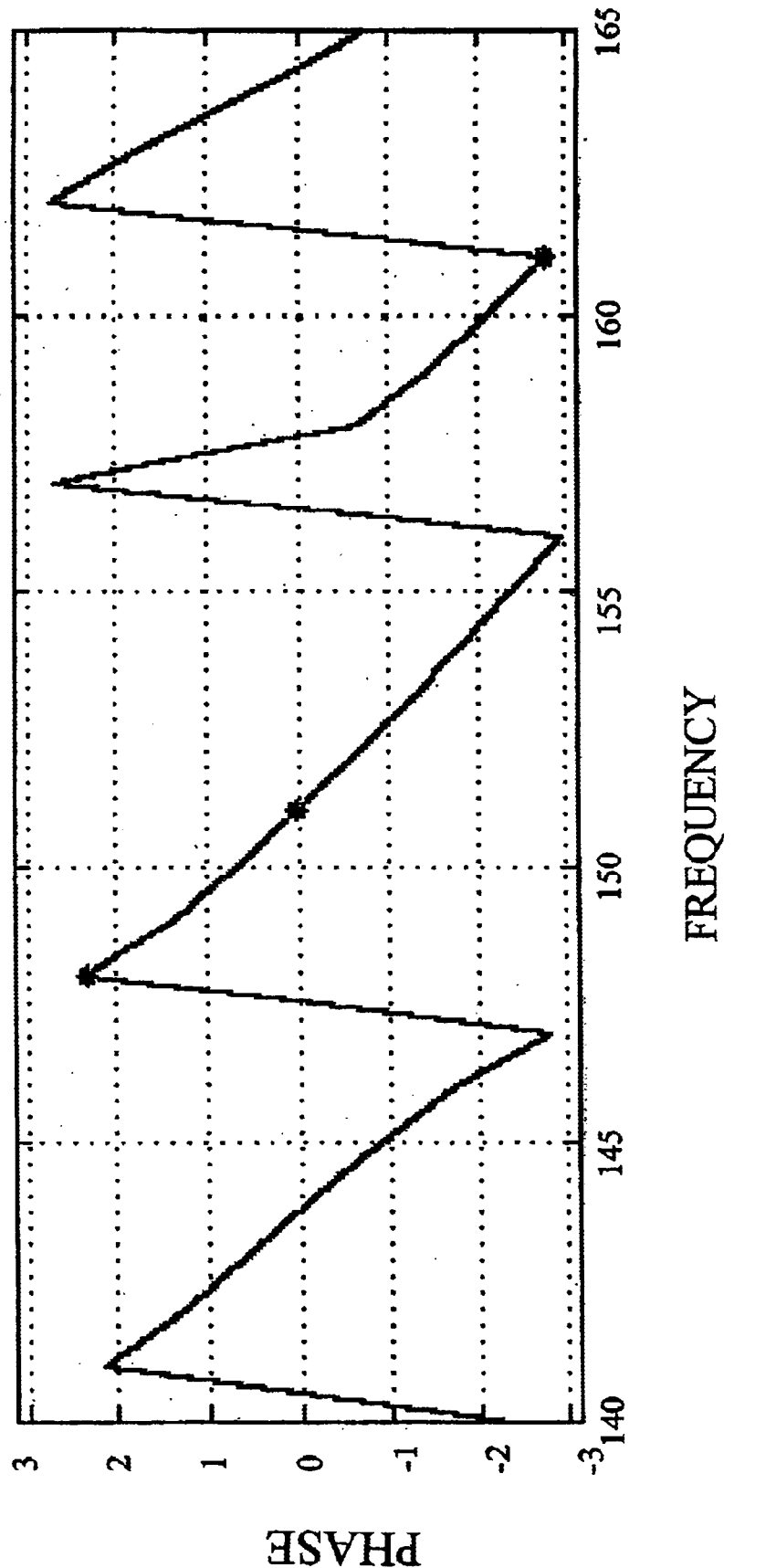

FIGS. 6a and 7a present magnitude responses for an optimal left and right sub-aperture filter tuned specifically to the frequency of Table 1's scatterer two, while FIGS. 6b and 7b provide optimal phase responses, respectively. The horizontal axes in FIGS. 6a, 6b, 7a and 7b are magnified to indicate the region in the immediate vicinity of scatterer two, wherein the horizontal axis represents multiples of frequency $\pi/150$. The specific values of the filter responses for scatterer one, scatterer two, and scatterer three are indicated on the plots of FIGS. 6a, 6b, 7a, and 7b, from left to right, respectively and accordingly.

As expected according to the constraints on the filters 16, 18, the magnitude response at $\omega=151\pi/150$, or scatterer two, is unity in FIGS. 6a and 7a. It can also be noted that neither magnitude response of FIG. 6a nor FIG. 7a possess a peak at this location. Additionally, because the interfering scatterers (i.e., one and three) have the same magnitude in the left and right sub-apertures 12, 14 (see Table 1), the magnitude responses of the two optimal filters 16, 18 are identical. Alternately, by referring to FIGS. 6b and 7b, it can be shown that the phase responses are different. In fact, it can be recognized that it is through these frequency-dependent phase differences that the ABC method and system can produce perfect cancellation in this illustrative example.

Referring back to Table 1, it can be seen that scatterer one has a phase change of $+\pi/2$ between the left sub-aperture 12 and the right sub-aperture 14, while scatterer three has a phase change of $-\pi/2$. Accordingly, from FIGS. 6b and 7b, it can be shown that the difference in the phase responses of the two filters at $\omega=148\pi/150$ is $-\pi/2$, and the difference in the phase response at $\omega=161\pi/150$ is $+\pi/2$. Hence, the appropriate amount of phase change can be applied at these frequencies to phase-coordinate the corresponding filter outputs for direct combination and accordingly allow minimization or cancellation of the energy at these frequencies. Additionally, the ABC methods and systems do not apply a phase adjustment to the frequency $\omega=151\pi/150$, because there is not a phase change between the left and right sub-apertures 12, 14 at this frequency.

Those with ordinary skill in the art will recognize that although the above example was discussed relative to single dimension data, the image or signal data to be processed can be multi-dimensional. In one embodiment, multi-dimensional data can be changed to a single or lesser dimension. For example, two-dimensional data can be ordered into a single dimension. Additionally and optionally, larger portions of data to be processed can be divided into sub-data portions or sub-images.

In one embodiment, the methods and systems can be implemented to provide coherent change detection. In such an embodiment, the techniques can be used to compare data from approximately the same geometry, and reveal changes that can include minor changes, between the images.

One potential advantage of the methods and systems is that the disclosed techniques compensate for phase in a coherent sensor system, subject to a constraint of an ideal or model filter response.

What has thus been described is a method and system that include a first measurement signal and a second measurement signal that can be input to first and second filters. The filters can be subject to a first constraint to minimize the energy difference between the first and second measurement signals on a per frequency basis, and subject to a second constraint that includes a model frequency and phase response. By adapting the filters subject to the two constraints, coherent differences between the two measurement signals can be identified. In one embodiment, the system can be applied to Synthetic Aperture Radar (SAR) data.

The techniques described herein are not limited to a particular hardware or software configuration, and may find applicability in many computing or processing environments. The techniques can be implemented in hardware or software, or a combination of hardware and software. The techniques can be implemented in one or more computer programs executing on one or more programmable computers that include a processor, a storage medium readable by the processor (including volatile and non-volatile memory and/or storage elements), one or more input devices, and one or more output devices.

The computer program(s) is preferably implemented in one or more high level procedural or object-oriented programming languages to communicate with a computer system; however, the program(s) can be implemented in assembly or machine language, if desired. The language can be compiled or interpreted.

The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The system can also be considered to be implemented as a computer-readable storage medium, configured with a computer program, where the storage medium so configured causes a computer to operate in a specific and predefined manner.

Although the methods and systems have been described relative to specific embodiments thereof, the methods and systems are not so limited. Obviously many modifications and variations may become apparent in light of the above teachings. For example, the methods and systems can be applied to any data, and are not limited to SAR data or SAR applications. For example, acoustic sensor data, seismic sensor data, and ultrasound sensor data can be other examples of coherent data sensors that can provide data for the ABC systems and methods, although such systems are provided for illustration and not limitation. Although the methods and systems herein were presented as In discrete systems, the methods and systems can be applied to continuous data and can utilize analog methods and components. In one embodiment, the adaptive filters can utilize only one of the two filter constraints provided herein. Although the model responses for the illustrative embodiment included a unity gain, the model responses are not limited to such gain and/or phase responses as provided in the example, and a single model response can be utilized for both filters. In an embodiment, M can be equal to N.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A method for comparing a first signal and a second signal, the method comprising,
    applying a first filter to the first signal,
    applying a second filter to the second signal,
    constraining the first filter and the second filter to minimize the energy difference between the filtered first signal and the filtered second signal and based on a model response having a model magnitude and a model phase, and,
    determining signal components for which the energy difference exceeds a threshold.

2. A method according to claim 1, wherein constraining the first filter and the second filter further includes constraining the first filter and the second filter to provide unity magnitude.

3. A method according to claim 1, wherein applying the first filter to the first signal and the second filter to the second signal further includes,
    constraining the first filter to provide unity magnitude and zero phase, and,
    constraining the second filter to provide unity magnitude and variable phase.

4. A method according to claim 1, wherein constraining the first filter and the second filter further includes minimizing the energy based on phase.

5. A method according to claim 1, wherein constraining the first filter and the second filter further includes constraining based on the phase of the model response.

6. A method according to claim 1, wherein providing a first signal includes providing a first vector.

7. A method according to claim 1, wherein providing a second signal includes providing a second vector.

8. A method according to claim 1, wherein providing a first signal includes,
    providing image data,
    computing a two-dimensional, inverse discrete Fourier transform using the image data,
    converting the inverse Fourier transform data to a one-dimensional vector.

9. A method according to claim 8, further including removing an extant aperture weighting from the inverse Fourier transform data.

10. A method according to claim 1, wherein providing a second signal includes,
    providing image data,
    computing a two-dimensional, inverse discrete Fourier transform using the image data,
    converting the inverse Fourier transform data to a one-dimensional vector.

11. A method according to claim 1, further including computing an adaptive threshold, and wherein determining signal components includes determining signal components for which the mean energy difference exceeds the adaptive threshold.

12. A method according to claim 1, wherein determining the signal components for which the energy difference exceeds a threshold further includes determining at least one frequency for which the mean energy difference exceeds a threshold.

13. A method according to claim 1, wherein minimizing the energy difference includes minimizing the mean energy difference.

14. A method according to claim 1, wherein applying a first filter to the first signal and applying a second filter to the second signal includes applying at least one finite impulse response filter.

15. A method according to claim 1, wherein applying a first filter to the first signal and applying a second filter to the second signal includes,
    computing a first inner product to generate a first scalar, and,
    computing a second inner product to generate a second scalar.

16. A method according to claim 1, wherein constraining the first filter and the second filter to minimize the energy difference includes minimizing at least one compensation term based on the first filter and the second filter.

17. A method according to claim 1, wherein constraining the first filter and the second filter to minimize the energy difference includes minimizing a summation that includes a difference between the first filtered signal and the second filtered signal, and at least one compensation term.

18. A method according to claim 1, wherein constraining the first filter and the second filter to minimize the energy difference includes,
    selecting a compensation term based on the first filter,
    selecting a compensation term based on the second filter, and,
    minimizing a sum including a product of the first compensation term and the first filter's squared Euclidean norm, and a product of the second compensation term and the second filter's squared Euclidean norm.

19. A method according to claim 1, wherein constraining the first filter and the second filter to minimize the energy difference includes minimizing the energy on a per frequency basis.

20. A method of providing coherent change detection, the method comprising,
    applying a first filter to the first signal,
    applying a second filter to the second signal,
    constraining the first filter and the second filter to minimize the energy difference between the filtered first signal and the filtered second signal, based on at least one model response, and,
    determining signal components for which the mean energy difference exceeds a threshold.

21. A method according to claim 20, wherein constraining based on at least one model response further includes constraining at least one of the first filter and the second filter to provide unity gain.

22. A method according to claim 20, wherein constraining based on at least one model response further includes constraining at least one of the first filter and the second filter to provide variable phase.

23. A method according to claim 20, wherein constraining further includes minimizing the energy difference based on phase.

24. A method according to claim 20, wherein constraining further includes minimizing the mean energy difference.

25. A method according to claim 20, further including discretizing the first signal and the second signal.

26. A method according to claim 20, further including computing an adaptive threshold, and wherein determining signal components includes determining signal components for which the energy difference exceeds the adaptive threshold.

27. A method according to claim 20, wherein constraining the first filter and the second filter to minimize the energy difference includes minimizing at least one compensation term based on the first filter and the second filter.

28. A method according to claim 20, wherein constraining the first filter and the second filter to minimize the energy difference includes minimizing the energy difference on a per frequency basis.

29. A system for comparing a first signal and a second signal, comprising,
a first filter to filter the first signal,
a second filter to filter the second signal, and,
a constraint module to adapt at least one of the first filter and the second filter to minimize an energy difference between the first-filtered signal and the second filtered signal, based on at least one model response having at least one model phase and at least one model magnitude.

30. A system according to claim 29, further including,
a first model filter response to which the first filter output is constrained, and,
a second model filter response to which the second filter output is constrained.

31. A system according to claim 29, wherein
the first model filter response includes unity magnitude and zero phase, and,
the second model filter response includes unity magnitude and variable phase.

32. A system according to claim 29, further including a threshold to which the energy signal can be compared.

33. A method according to claim 29, wherein at least one of the first signal and the second signal are derived from at least one of a first image and a second image.

34. A method of comparing a first data signal and a second data signal, the first and second data signals from a coherent sensor, the method comprising,
providing a first one-dimensional vector of length M based on the first data signal,
providing a second one-dimensional vector-of length M based on the second data signal,
providing a first filter vector of length M,
providing a second filter vector of length M,
computing at least one first inner product between the first vector and the first filter vector,
computing at least one second inner product between the second vector and the second filter vector,
squaring the differences of the at least one first scalar products and the at least one second inner products,
determining coefficients for the first filter vector and the second filter vector based on minimizing the squared differences, and
comparing the squared differences to a threshold., 35. A method according to claim 34, further including,
computing a first squared Euclidean norm based on the first filter vector,
computing a second squared Euclidean norm based on the second filter vector,
determining a first multiplier for the first squared Euclidean norm,
determining a second multiplier for the second squared Euclidean norm,
and wherein minimizing the squared differences includes minimizing the additive quantity that includes the first multiplier multiplied by the first squared Euclidean norm, added to the second multiplier multiplied by the second Euclidean norm.

36. A method according to claim 34, wherein providing a first one-dimensional data vector includes providing the first data signal based on a first image.

37. A method according to claim 34, wherein providing a second one-dimensional data vector includes providing the second data signal based on a second image.

38. A method according to claim 34, wherein at least one of the first data signal and the second data signal are of length N, wherein N is greater than M.

39. A system for comparing a first signal and a second signal, comprising,
first filter means to filter the first signal,
second filter means to filter the second signal, and,
means to constrain at least one of the first filter and the second filter to minimize an energy difference between the first filtered signal and the second filtered signal, based on at least one model response having at least one model phase and at least one model magnitude.

40. A system according to claim 39, further including,
means to provide a first model filter response to which the first filter output is constrained, and,
means to provide a second model filter response to which the second filter output is constrained.

41. A system according to claim 39, wherein
the first model filter response includes unity magnitude and zero phase, and,
the second model filter response includes unity magnitude and variable phase.

42. A system according to claim 39, further including a threshold means for providing a threshold to which the energy signal can be compared.

43. A computer program product disposed on a computer readable medium, for comparing a first signal and a second signal, the computer program product having a processor with instructions for causing the processor to,
apply a first filter to the first signal,
apply a second filter to the second signal,
constrain the first filter and the second filter to minimize the energy difference between the filtered first signal and the filtered second signal and based on a model response having a model magnitude and a model phase, and,
determine signal components for which the energy difference exceeds a threshold.

44. A computer program product according to claim 43, wherein instructions to constrain the first filter and the second filter further include instructions to constrain the first filter and the second filter to provide unity magnitude.

45. A computer program product according to claim 43, wherein instructions to apply the first filter to the first signal and the second filter to the second signal further include instructions to,
- constrain the first filter to provide unity magnitude and zero phase, and,
- constrain the second filter to provide unity magnitude and variable phase.

46. A computer program product according to claim 43, wherein instructions to constrain the first filter and the second filter further include instructions to minimize the energy based on phase.

47. A computer program product according to claim 43, wherein instructions to constrain the first filter and the second filter further include instructions to constrain based on the phase of the model response.

48. A computer program product according to claim 43, wherein instructions to provide a first signal include instructions to provide a first vector.

49. A computer program product according to claim 43, wherein instructions to provide a second signal include instructions to provide a second vector.

50. A computer program product according to claim 43, wherein instructions to provide a first signal include instructions to,
- provide image data,
- compute a two-dimensional, inverse discrete Fourier transform using the image data,
- convert the inverse Fourier transform data to a one-dimensional vector.

51. A computer program product according to claim 43, wherein instructions to provide a second signal include instructions to,
- provide image data,
- compute a two-dimensional, inverse discrete Fourier transform using the image data,
- convert the inverse Fourier transform data to a one-dimensional vector.

52. A computer program product according to claim 43, further including instructions to compute an adaptive threshold, and wherein instructions to determine signal components include instructions to determine signal components for which the mean energy difference exceeds the adaptive threshold.

53. A computer program product according to claim 43, wherein instructions to determine the signal components for which the energy difference exceeds a threshold further include instructions to determine at least one frequency for which the mean energy difference exceeds a threshold.

54. A computer program product according to claim 43, wherein instructions to minimize the energy difference include instructions to minimize the mean energy difference.

55. A computer program product according to claim 43, wherein instructions to apply a first filter to the first signal and applying a second filter to the second signal include instructions to apply at least one finite impulse response filter.

56. A computer program product according to claim 43, wherein instructions to apply a first filter to the first signal and applying a second filter to the second signal include instructions to,
- compute a first inner product to generate a first scalar, and,
- compute a second inner product to generate a second scalar.

57. A computer program product according to claim 43, wherein instructions to constrain the first filter and the second filter to minimize the energy difference include instructions to minimize at least one compensation term based on the first filter and the second filter.

58. A computer program product according to claim 43, wherein instructions to constrain the first filter and the second filter to minimize the energy difference include instructions to minimize a summation that includes a difference between the first filtered signal and the second filtered signal, and at least one compensation term.

59. A computer program product according to claim 43, wherein instructions to constrain the first filter and the second filter to minimize the energy difference include instructions to,
- select a compensation term based on the first filter,
- select a compensation term based on the second filter, and,
- minimize a sum including a product of the first compensation term and the first filter's squared Euclidean norm, and
- a product of the second compensation term and the second filter's squared Euclidean norm.

60. A computer program product according to claim 43, wherein instructions to constrain the first filter and the second filter to minimize the energy difference include instructions to minimize the energy on a per frequency basis.

* * * * *